(12) United States Patent
Thibaut et al.

(10) Patent No.: US 9,724,806 B2
(45) Date of Patent: Aug. 8, 2017

(54) DEVICE FOR CLAMPING A WORKPIECE TO A WORKBENCH

(71) Applicant: THIBAUT SAS, Vire (FR)

(72) Inventors: Jacques Thibaut, Vaudry (FR); Christophe Thibaut, Vire (FR)

(73) Assignee: THIBAUT SAS, Vire (FR)

( * ) Notice: Subject to any disclaimer, the term of this patent is extended or adjusted under 35 U.S.C. 154(b) by 72 days.

(21) Appl. No.: 14/734,626

(22) Filed: Jun. 9, 2015

(65) Prior Publication Data

US 2015/0352694 A1 Dec. 10, 2015

(30) Foreign Application Priority Data

Jun. 10, 2014 (FR) ...................................... 14 55255

(51) Int. Cl.
*B25B 11/00* (2006.01)
*B23Q 3/08* (2006.01)

(52) U.S. Cl.
CPC ............ *B25B 11/007* (2013.01); *B23Q 3/088* (2013.01); *B25B 11/005* (2013.01)

(58) Field of Classification Search
USPC ......................................................... 269/21
See application file for complete search history.

(56) References Cited

U.S. PATENT DOCUMENTS

| 4,561,642 A * | 12/1985 | Parque | B25B 11/005 269/21 |
| 4,934,641 A * | 6/1990 | McElhaney | B23K 9/32 248/206.2 |
| 5,511,752 A * | 4/1996 | Trethewey | F16B 47/00 248/205.8 |
| 6,095,506 A * | 8/2000 | Schmalz | B25B 11/005 269/21 |
| 6,302,387 B1 * | 10/2001 | Schmalz | B25B 11/005 269/20 |
| 2009/0309283 A1 * | 12/2009 | Blick | B23Q 1/032 269/259 |
| 2013/0270757 A1 * | 10/2013 | Thibaut | B23Q 1/03 269/21 |

FOREIGN PATENT DOCUMENTS

| DE | 101 19 029 A1 | 10/2002 | |
| EP | 2 682 226 A1 | 1/2014 | |
| FR | 2950556 A1 * | 4/2011 | ............... B23Q 1/38 |
| FR | 2 969 024 A1 | 6/2012 | |
| WO | 2012/085446 A1 | 6/2012 | |

OTHER PUBLICATIONS

FR Search Report, dated Jan. 26, 2015, from corresponding FR application.

* cited by examiner

*Primary Examiner* — Larry E Waggle, Jr.
*Assistant Examiner* — Alvin Grant
(74) *Attorney, Agent, or Firm* — Ipsilon USA, LLP

(57) ABSTRACT

A device for clamping a workpiece (P) to a workbench (T) includes a body (1) containing a vacuum-generating element. The body (1) has a lower cavity (2) open at the bottom and positioned in the vicinity of a face for securing to the workbench (T). The lower cavity (2) forms a vacuum reserve, this vacuum reserve being connected by a substantially straight duct (6) to an upper face for securing a workpiece (P).

10 Claims, 2 Drawing Sheets

DEVICE FOR CLAMPING A WORKPIECE TO A WORKBENCH

FIELD OF THE INVENTION

The invention relates to a device for clamping a workpiece on a workbench, of the type comprising a first face for securing by vacuum to a workbench and a second face for securing by vacuum a workpiece.

BACKGROUND OF THE INVENTION

Document WO 2012/085 446 describes a device forming the workpiece clamp comprising a body having a first face for securing by vacuum to a workbench and a second face for securing by vacuum a workpiece. The body contains a vacuum pump and a rechargeable electric battery for powering said vacuum pump. A buffer reserve of vacuum connected to the vacuum pump ensures even operation of the vacuum pump and prevents repeated closely-spaced stops and starts. A fluid curtain arranged at the periphery of the upper second face forming a suction cup for securing by means of vacuum may be provided in order to form a concentric capillary seal and prevent the upper second face forming a suction cup for securing by vacuum from coming unstuck furthermore preventing the ingress of dust, sludge, undesirable chips or other particles. Filters are provided on the fluid curtain circuit and on the vacuum pump vacuum circuit.

The device of document WO 2012/085 446 is satisfactory when the workpieces are workpieces that have a relatively smooth surface allowing the second face for securing by vacuum to adhere well. However, application of this device to the clamping of workpieces made up of materials that are rocky, abrasive or generate dust, impurities or chips presents a number of disadvantages.

On the one hand, the presence of dust, impurities or chips prevents a good seal between the securing faces and produces leaks of vacuum entailing a repeated running of the vacuum pump.

On the other hand, the plugging or contamination of the protective filters means that frequent cleaning is required and significant pressure drops are created in the flows of air or fluid within the workpiece clamp.

These disadvantages may also lead to the vacuum pump and the fluid curtain supply pump having a limited life.

Finally, the gripping of the workpiece on the upper securing suction cup is sometimes imperfect, and this too leads to sources of leakage and detracts from the good quality of the clamping.

SUMMARY OF THE INVENTION

It is an object of the invention to overcome the disadvantages of the known art by proposing a novel device in which pressure drops are reduced.

It is another object of the invention to propose a novel device in which the gripping of the workpiece on the securing upper suction cup occurs instantly through suction, and thus makes the clamping of the workpiece highly effective.

One subject of the invention is a device for clamping a workpiece on a workbench, of the type comprising a first face for securing by vacuum to a workbench and a second face for securing by vacuum a workpiece, in which device a body contains a vacuum-generating means connected to said first face for securing by vacuum to the workbench, characterized in that the body has a lower cavity open at the bottom and positioned in the vicinity of said first face for securing by vacuum to the workbench, in that said cavity forms a vacuum reserve and in that said vacuum reserve is connected by a substantially straight duct to said second face for securing the workpiece by vacuum, so as to constitute a vacuum shock when said duct is opened and suction on the side of said second securing face, so that the gripping of the workpiece occurs instantaneously, with any water and impurities being sucked into and trapped in said vacuum reserve.

According to other alternative features of the invention:

- The cavity forming a vacuum reserve is advantageously defined by a hollow volume formed at the base of the body and by a peripheral seal in contact with the workbench.
- The duct connecting the vacuum reserve to the second face for securing the workpiece preferably comprises a pneumatically operated flow valve.
- The body may have an upper face for the fluidtight mounting of a head for the vacuum clamping of the workpiece.
- A clamping head for the clamping of the workpiece may comprise a means for rotation-proof mounting on the mounting upper face of the body.
- A workpiece clamping head may comprise a radially outer screw ring intended to collaborate with a fixed nut formed on the mounting upper face of the body.
- The clamping head may be of any shape: round, square, rectangular, or some other shape suited to the vacuum mounting of a workpiece.
- The body may be able to accept a stop comprising a screw ring intended to collaborate with a tapping of the body.

BRIEF DESCRIPTION OF THE DRAWINGS

The invention will be better understood through the description which follows which is given by way of non-limiting example with reference to the attached drawings in which.

DETAILED DESCRIPTION OF THE INVENTION

Figure 1:
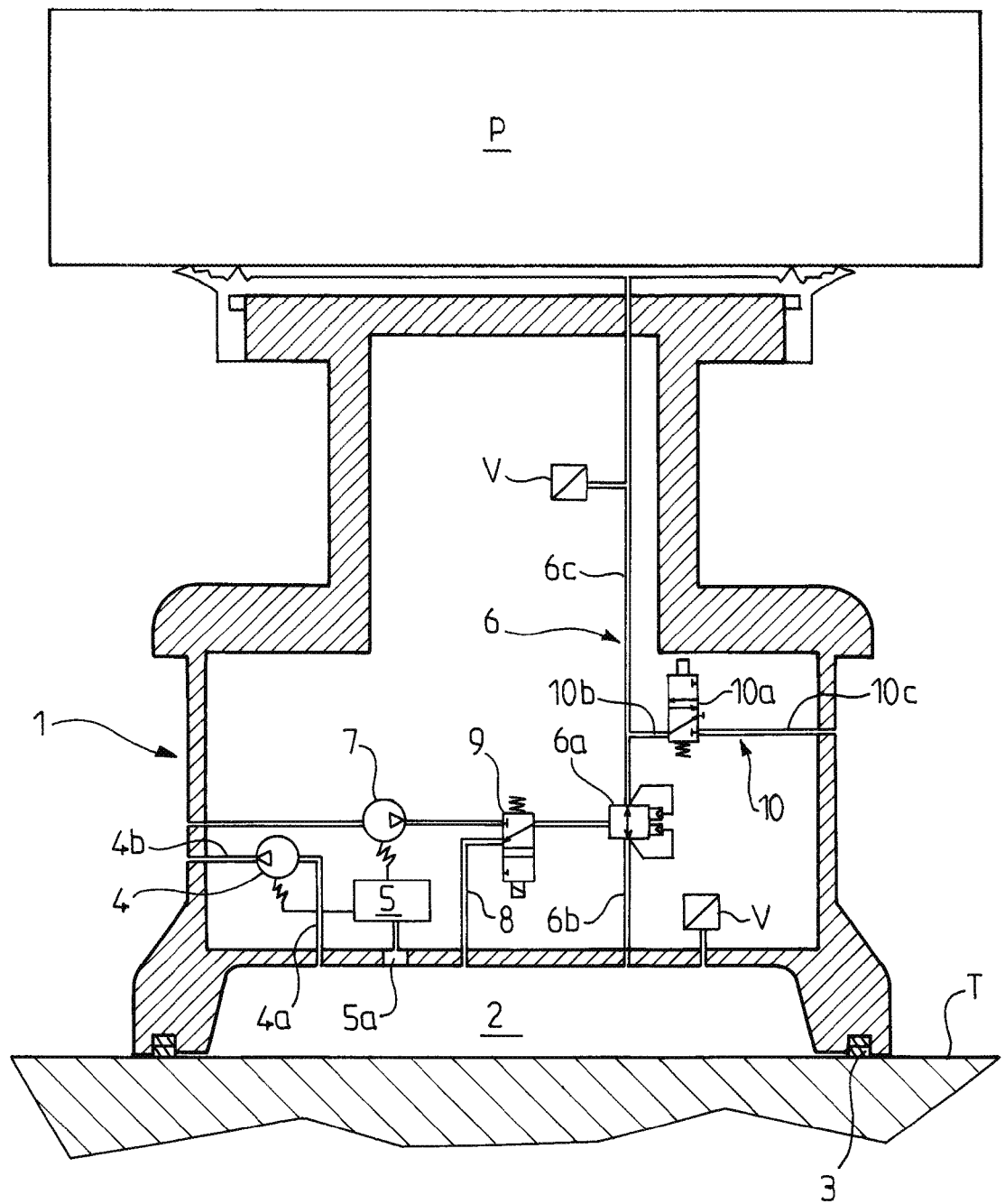
FIG. 1 is a schematic view in diametral section of a first embodiment of a clamping device according to the invention.
Figure 2:
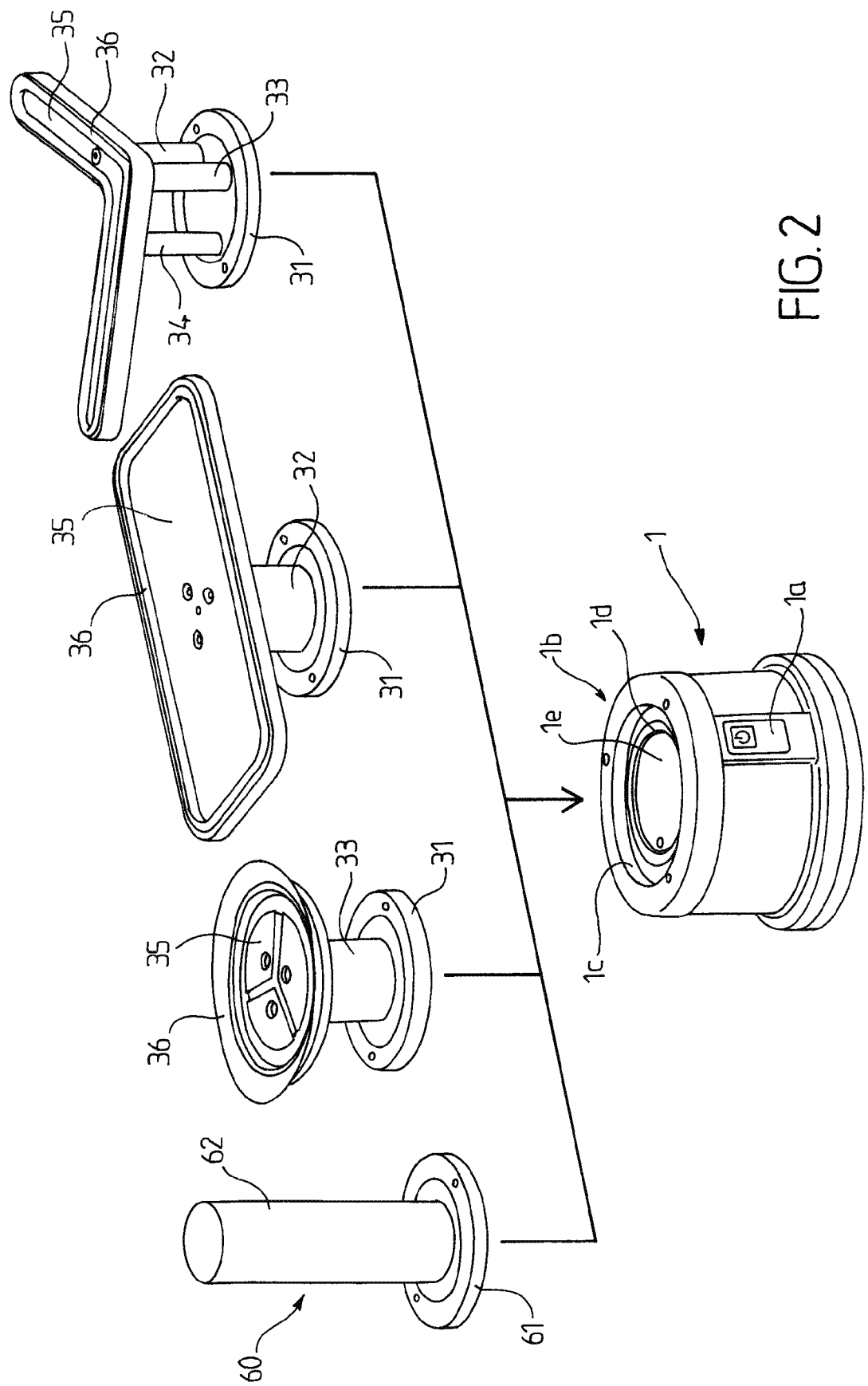
FIG. 2 is a schematic perspective view illustrating various types of mounting corresponding to clamping devices according to the invention.

With reference to FIGS. 1 and 2, elements that are identical or functionally equivalent are identified by identical reference numbers.

In FIG. 1, a first embodiment of a clamping device according to the invention comprises a body 1 of substantially cylindrical shape containing a vacuum-generating means for positioning the body on a workbench T and securing it to the workbench T by vacuum.

A cavity 2 is formed in the lower part of the body 1 to constitute a vacuum reserve. The cavity 2 is bounded by a peripheral seal 3 and defines a hollow volume formed at the base of the body, this volume constituting the vacuum reserve.

A vacuum pump 4 is powered by a power source 5, generally comprising several rechargeable electric batteries.

The vacuum pump 4 communicates directly, with no filters interposed, with the cavity 2 via a suction duct 4a to constitute a vacuum reserve.

The vacuum pump 4 discharges the air sucked up in the cavity 2 by a duct 4b connected to the atmosphere.

The vacuum pump 4 comprises an internal valve, in a way known per se, to prevent any filling of the cavity 2 with external air if operation ceases.

The vacuum pump 4 is arranged in the vicinity of the cavity 2, so that the ducts 4a and 4b are relatively short, so as to reduce pressure drops and increase the efficiency of the vacuum pump 4.

In order to avoid any plugging or loss of efficiency of the vacuum creation, no filters are provided on the ducts 4a, 4b.

To prevent undesirable particles being sucked in, the suction duct 4a opens into the cavity 2 near the top so that undesirable particles remain in the vicinity of the surface of the workbench T.

A full-bore vertical duct 6 is provided in order instantly to place under vacuum the second face for securing by vacuum a workpiece P so that gripping of this workpiece P occurs instantaneously.

The vacuum shock upon opening the duct 6 causes any water and impurities present on the side of the upper face for securing to be sucked in so that the gripping of the workpiece occurs instantly with the water and impurities being sucked in and trapped in the vacuum reserve 2.

The duct 6 for applying vacuum to the upper face for securing is a full-bore duct except for a pneumatically operated valve 6a comprising a flexible shutter.

According to one advantageous alternative form, the pneumatically operated valve 6a can be disconnected and positioned directly on the side of the cavity 2 so that the flexible shutter thereof can easily be cleaned.

The pneumatically operated valve 6a may delimit a lower duct portion 6b and an upper duct portion 6c, as depicted in FIG. 1.

Unlike the device of document WO 2012/085 446, the vacuum pump 4 here acts only on the lower face for securing to the workbench T by constituting enough of a vacuum reserve in the cavity 2 that a vacuum shock is created when the valve 6a is opened.

This vacuum shock suddenly sucks the workpiece P and compresses the securing suction cup.

The vacuum pump 4 maintains the vacuum by reconstituting the vacuum reserve in the cavity 2, then stops when the desired level of vacuum is reached.

Unlike the device of document WO 2012/085 446, there is no need to form a concentric capillary seal at the level of the upper second securing face.

The gripping of the upper suction cup against the workpiece P thus occurs instantly and prevents any undesirable shifting of the workpiece P that could result from lateral slippage caused by poor application of vacuum.

A pneumatically operated pump 7 is provided for operating the pneumatic valve 6a.

The pneumatic valve 6a may be controlled by a positive pressure generated by the pump 7 or by a vacuum from a duct 8 in communication with the vacuum reserve of the cavity 2.

The directional control valve 9 makes it possible to control the position of the valve 6a by establishing communication with a positive pressure generated by the pump 7 or a vacuum from the duct 8.

Finally, a venting of the securing upper face to the atmosphere is provided via a duct 10 comprising a directional control valve 10a thus defining two portions 10b and 10c of the vent duct 10.

In the known way, a lower vacuum gauge V monitors the vacuum of the cavity 2 and an upper vacuum gauge V monitors the vacuum for the clamping of the workpiece P.

A programmable electronic control circuit, not depicted, runs the device according to the invention and controls the vacuum pump 4, positive pump 7, and directional control valves 9 and 10a while monitoring the level of charge of the electric batteries 5.

When the level of charge of the batteries 5 is insufficient or the remaining power available will not allow a number of cycles to be run, the device according to the invention is taken away by the machine working the workpieces P to be placed via its plug 5a on an electric recharging means that has not been depicted.

The machine working the workpieces P preferably comprises a magazine capable of storing a plurality of devices according to the invention.

By virtue of the invention, the clamping devices may first of all be positioned on the workbench, so that the cavities 2 of the devices already in position can be evacuated in order quickly to form a vacuum reserve and thus allow near instantaneous clamping of a workpiece on a plurality of devices.

Monitoring the vacuum in the cavity 2 and monitoring the available energy level allows the number of devices that need electrically recharging to be managed so as to increase the productivity of the machine working the workpieces P.

The absence of a filter and any obstructing of the vacuum ducts makes for effective operation and avoids the stoppages required to unplug and clean the ducts and filters of the prior art.

Providing a cavity 2 that is open at the bottom means that this part can be cleaned out periodically thereby avoiding a build up of dust or undesirable impurities.

The vacuum gauges V are vacuum detectors for detecting the vacuum generated on the lower first face for securing by vacuum to the workbench and on the second face for securing by vacuum a workpiece.

The vacuum gauges V deliver electrical or mechanical signals indicating the level of a vacuum which is indicative of the amount of holding force on the lower first face for securing by vacuum to the workbench and on the second face for securing by vacuum the workpiece.

The levels of vacuum transmitted by the vacuum gauges V to the working machine are transmitted wirelessly, preferably as radio waves. The available power level is also transmitted wirelessly, preferably by radio waves.

The full-bore passage through the ducts 4a, 4b, 6b, 6c and through the valve 6a allows the time taken to create the vacuum and clamping to be reduced appreciably by comparison with the prior art described in document WO 2012/085 446.

The absence of filters or any other through-flow components liable to become plugged or suffer pressure drops also increases productivity. However, the opening of the duct 6 produces suction on the side of the second securing face, and the gripping of the workpiece occurs instantly while at the same time any water and impurities are sucked into and trapped in the vacuum reserve 2.

This water and any impurities trapped in the vacuum reserve 2 in this way settle(s) onto the workbench T and can be removed later, after the body 1 has been removed, simply by wiping the workbench T.

The cavity 2 has a hollow volume defined by the outline of the seal 3 and the workbench which is very much higher than the volume contained between the upper suction cup and the workpiece P.

Finally, providing a cavity 2 that is open at the bottom means that these impurities and this dust, if any, can be left to settle directly onto the workbench T so that the device according to the invention is not contaminated with this/ these undesirable dust or impurities.

The improved conductance of the ducts 4a, 4b, 6b, 6c also allows the use of a vacuum pump with properties that are inferior by comparison with the prior art, and which consumes less energy than the vacuum pump of the prior art.

An external means constituting a manual switch for switching the device on and off according to the invention is provided, in a way known per se, and requires no further detailed description. This means may comprise a switch for stopping and starting the power supply.

Alternatively, the device according to the invention may be controlled remotely by the working machine, for example by a wireless connection or by some other means.

The operation of the device of FIG. 1 may be implemented manually or automatically by a working machine fitted with a spindle suited to that purpose, and this operation will now be described hereinafter.

In FIG. 1, having positioned the workpiece clamps, the vacuum pump 4 powered by its power source 5 is activated in such a way as to create a vacuum in the cavity 2, bounded by the seal 3 in contact with the workbench T.

Having thus clamped the lower part of the body 1 in contact with the workbench T, the workpiece P is placed on the upper suction cup defining the second securing face and the valve 6a is made to open so as to place the volume comprised between the upper suction cup and the workpiece P in communication with the vacuum reserve formed in the cavity 2.

This communication gives rise to a vacuum shock and a compression of the upper vacuum cup on which the workpiece P becomes gripped.

The reverse operations are then performed in order to free the finished part P and detach the workpiece clamps.

In FIG. 2, a preferred embodiment of the device according to the invention comprises a body 1 and a clamping head selected according to the position and work to be carried out.

The body 1 is a part of a device intended to be fixed to a workbench T in order to constitute a clamping device according to the invention or possibly to constitute a lateral stop for a workpiece.

The body 1 has an external switch is for switching on the electrical power source contained in the body and an upper mounting configuration 1b.

The upper mounting configuration 1b comprises a fixed nut 1c consisting of a large-diameter tapping formed in the upper part, an O-ring seal 1d, and a centring pin 1e intended to serve as a rotation-proofing means for a clamping head chosen from a group having varying outlines.

A clamping head 30 for example comprises a lower part consisting of an annular ring 31 mounted around a central element bearing at least one duct 32 or 33 or 34.

This clamping head 30 at the lower part comprises a bore intended to collaborate with the centring pin 1e to constitute rotation-proofing means and to avoid rubbing on the seal 1d when the annular ring 41 and the tapping is of the body 1 are being screwed together.

Of the ducts 32 to 34 at least one opens into a hollow volume of a component 35 bearing a seal 36 making it possible to form a clamping surface.

A part 35 bearing a seal 36 may be any shape: round, square, rectangular, bracket-shaped, or any other shape suited to the vacuum mounting of a workpiece.

Finally, a stop 60 is provided to prevent any lateral shifting of a workpiece.

The stop 60 is compatible with the body 1 but has no clamping function.

The stop 60 comprises an annular ring 61 and a means for rotation-proofed mounting which is intended to collaborate with the pin 1e of the body 1, and an upper extension 62 intended to constitute a lateral abutment contact for a workpiece P.

The invention described with reference to a number of particular embodiments is not any way restricted to these but on the other hand covers any modification in form and any alternative form of embodiment that falls within the scope and spirit of the attached claims.

The invention claimed is:

1. A device, for clamping a workpiece to a workbench, comprising:
a first face for securing by vacuum to a workbench and a second face for securing by vacuum a workpiece, wherein said device comprises a body having a bottom containing a vacuum-generating means connected to said first face for securing by vacuum to the workbench, wherein said body has a lower cavity opening to said first face and configured for securing by vacuum to the workbench, said cavity being also configured as a vacuum reserve which can be connected to said second face by a substantially straight duct, which opening is controlled via a valve, in such a way that when said duct is opened, said duct suction at said second securing face, so that the gripping of the workpiece occurs instantaneously, with any water and impurities being sucked into and trapped in said vacuum reserve.

2. The device according to claim 1, wherein the cavity forming a vacuum reserve is defined by a hollow space formed at a base of the body and by a peripheral seal in contact with the workbench.

3. The device according to claim 1, wherein the duct connecting the vacuum reserve to the second face for securing the workpiece comprises a pneumatically operated flow valve.

4. The device according to claim 1, wherein the body has an upper configuration for sealed mounting of a clamping head for the vacuum clamping of the workpiece.

5. The device according to claim 4, wherein the clamping head comprises a means for rotation-proof mounting to the sealed mounting upper configuration of the body.

6. The device according to claim 4, wherein the clamping head comprises a radially outer screw ring intended to collaborate with a tapping of the body.

7. The device according to claim 1, wherein the body of the device is able to accept a stop comprising a screw ring intended to collaborate with a tapping of the body.

8. The device according to claim 2, wherein the duct connecting the vacuum reserve to the second face for securing the workpiece comprises a pneumatically operated flow valve.

9. The device according to claim 2, wherein the body has an upper configuration for sealed mounting of a clamping head for the vacuum clamping of the workpiece.

10. The device according to claim 5, wherein the clamping head comprises a radially outer screw ring intended to collaborate with a tapping of the body.

* * * * *